United States Patent
Pouran Ben Veyseh et al.

(10) Patent No.: US 11,893,352 B2
(45) Date of Patent: Feb. 6, 2024

(54) DEPENDENCY PATH REASONING FOR MEASUREMENT EXTRACTION

(71) Applicant: ADOBE INC., San Jose, CA (US)

(72) Inventors: Amir Pouran Ben Veyseh, Eugene, OR (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 29 days.

(21) Appl. No.: 17/237,878

(22) Filed: Apr. 22, 2021

(65) Prior Publication Data

US 2022/0358291 A1 Nov. 10, 2022

(51) Int. Cl.
*G06F 40/295* (2020.01)
*G06F 40/216* (2020.01)

(52) U.S. Cl.
CPC .......... *G06F 40/295* (2020.01); *G06F 40/216* (2020.01)

(58) Field of Classification Search
CPC ....... G06F 40/216; G06F 40/295; G06F 40/30
See application file for complete search history.

(56) References Cited

U.S. PATENT DOCUMENTS

| | | | | |
|---|---|---|---|---|
| 9,262,406 B1* | 2/2016 | Das | ........................ | G06F 40/30 |
| 2013/0246046 A1* | 9/2013 | Fan | ........................ | G06F 40/30 704/9 |
| 2018/0232443 A1* | 8/2018 | Delgo | ................... | G06F 40/295 |
| 2021/0004438 A1* | 1/2021 | Iter | ....................... | G06F 40/295 |
| 2021/0224651 A1* | 7/2021 | Crone | .................... | G06F 40/295 |
| 2022/0147835 A1* | 5/2022 | Kuo | ........................ | G06F 40/30 |

FOREIGN PATENT DOCUMENTS

WO WO-2021013466 A1 * 1/2021 ............. G06F 40/30

OTHER PUBLICATIONS

Rui et al., "Words Based On A Dependence Relationship Of Viewpoint Drawing Method", published on Jan. 9, 2013, Document ID CN102866989A, pp. 10 (Year: 2013).*
Xiang et al., "A Dependency-based Semantic Entity Relation Extraction Method For Chinese Unsupervised Open", published on Oct. 24, 2017, Document ID CN 107291687A, pp. 9 (Year: 2017).*
1Xu, et al., "Semantic Relation Classification via Convolutional Neural Networks with Simple Negative Sampling", In EMNLP (2015), pp. 536-540.
2Zhang, et al., "Graph Convolution over Pruned Dependency Trees Improves Relation Extraction", In EMNLP (2018), pp. 2205-2215.
3Tishby, et al., "The information bottleneck method", In arXiv preprint arXiv:physics/0004057v1 {physics.data-an} Apr. 24, 2000, pp. 1-16.

* cited by examiner

*Primary Examiner* — Chau T Nguyen
(74) *Attorney, Agent, or Firm* — F. CHAU & ASSOCIATES, LLC

(57) ABSTRACT

The present disclosure provides systems and methods for relationship extraction. Embodiments of the present disclosure provide a relationship extraction network trained to identify relationships among entities in an input text. The relationship extraction network is used to generate a dependency path between entities in an input phrase. The dependency path includes a set of words that connect the entities, and is used to predict a relationship between the entities. In some cases, the dependency path is related to a syntax tree, but it may include additional words, and omit some words from a path extracted based on a syntax tree.

20 Claims, 9 Drawing Sheets

DEPENDENCY PATH REASONING FOR MEASUREMENT EXTRACTION

BACKGROUND

The following relates generally to natural language processing, and more specifically to relationship extraction.

Natural language processing (NLP) is a field of computer science relating to speech and text interactions between computers and humans. For example, a computer may be programmed to understand human language and respond accordingly. In some cases, the computer can encode and respond to the underlying nuances and context associated with natural language. This improves the communication between humans and computers.

Relationship extraction is a subtask of NLP that includes determining semantic relationships between entities in a document. For example, in the sentence "Barack Obama was born in Honolulu, Hawaii" the entity "Barack Obama" has the relationship bornInCity to "Honolulu, Hawaii".

In some cases, relationship extraction systems use sentence structure information to determine relationships among entities. However, sentence structure alone may not contain all the information used to determine entity relationships. For example, relationship extraction systems perform poorly on domain-specific tasks because the relationships between entities in domain-specific documents may depend on domain-specific context. Furthermore, the relationship categories may be specific to the domain. Therefore, there is a need in the art for improved systems and methods to perform relationship extraction on domain-specific text.

SUMMARY

The present disclosure provides systems and methods for relationship extraction. Embodiments of the present disclosure provide a relationship extraction network trained to identify relationships among entities in an input text. The relationship extraction network is used to generate a dependency path between entities in an input phrase. The dependency path includes a set of words that connect the entities, and is used to predict a relationship between the entities.

A method, apparatus, non-transitory computer-readable medium, and system for relationship extraction are described. One or more embodiments of the method, apparatus, non-transitory computer-readable medium, and system include generating a word representation for each word in an input phrase, wherein the input phrase includes a subject entity and an object entity, generating a path vector representing a transformation between the subject entity and the object entity based on the word representation, identifying words from the input phrase to include in a dependency path between the subject entity and the object entity based on the path vector and the word representation, computing a path representation by combining the word representation for the words included in the dependency path, and generating a probability distribution over a plurality of candidate relationships between the subject entity and the object entity based on the path representation.

An apparatus, system, and method for relationship extraction are described. One or more embodiments of the apparatus, system, and method include an input encoder configured to generate word representations for each word of an input phrase, wherein the input phrase includes a subject entity and an object entity, a path network configured to generate a path vector representing a transformation between the subject entity and the object entity, and a decoder configured to generate a probability distribution over a plurality of candidate relationships between the subject entity and the object entity, wherein the probability distribution is generated based on the path representation for words in a dependency path between the subject entity and the object entity.

A method, apparatus, non-transitory computer-readable medium, and system for relationship extraction are described. One or more embodiments of the method, apparatus, transitory computer-readable medium, and system include receiving a training phrase including a subject entity, an object entity, and a ground truth relationship between the subject entity and the object entity, generating a path vector representing a transformation between the subject entity and the object entity using a path network, generating a path representation based on a dependency path between the subject entity and the object entity, wherein words in the dependency path are identified based on the path vector, predicting a relationship between the subject entity and the object entity based on the path representation using a decoder, comparing the around truth relationship with the predicted relationship to produce a prediction loss, and training the path network based on the prediction loss.

DETAILED DESCRIPTION

Figure 1:
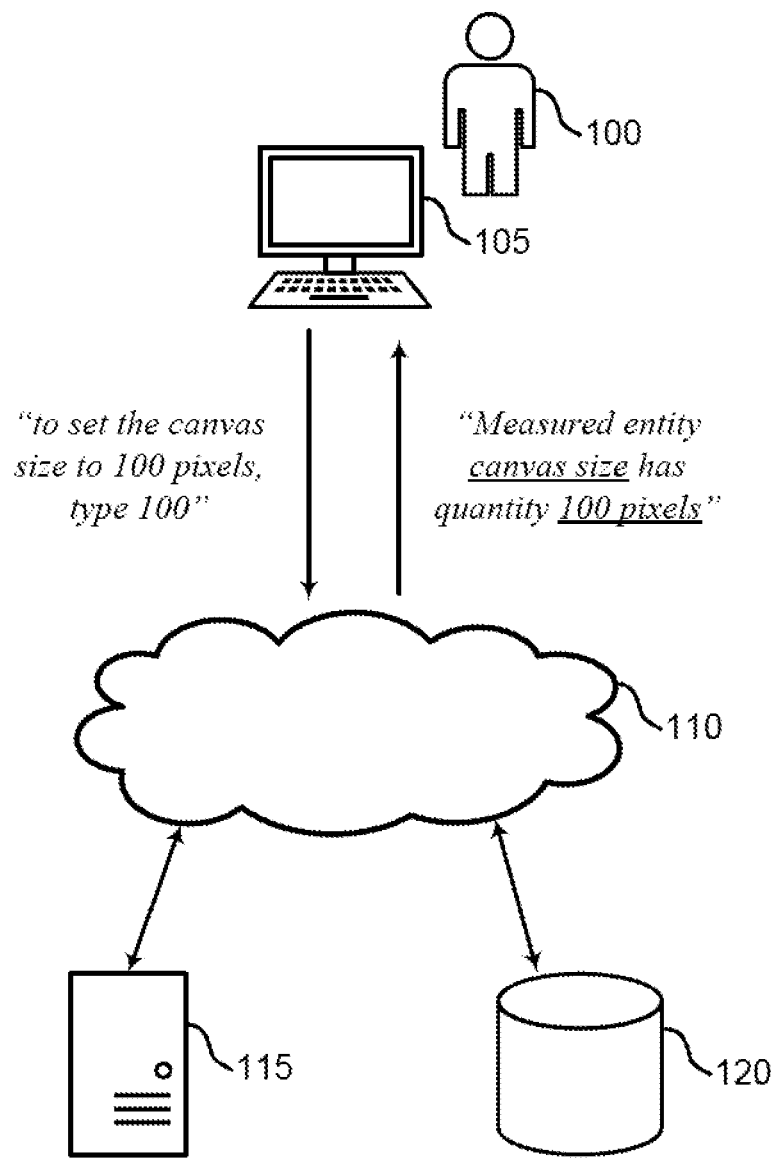
FIG. 1 shows an example of a relationship extraction diagram according to aspects of the present disclosure.

The present disclosure, relates to relationship extraction, Embodiments of the present disclosure include a relationship extraction network trained to identify relationships among entities in an input text. The relationship extraction network is used to generate a dependency path between entities in an input phrase. The dependency path includes a set of words that connect the entities, and is used to predict a relationship between the entities. In some cases, the dependency path is related to a syntax tree, but it may include additional words, and omit some words from a path derived based on a syntax tree.

Natural language processing (NLP) systems often perform poorly when processing text from specific domains such as technical literature. For example, relationship extraction systems lave difficulty identifying the relationship between measured entities and the associated measured properties and quantities. Some relationship extraction systems utilize the syntactic structure of an input phrase to determine a relationship between entities. However, in many cases the structure does not contain all of the information relevant to the entity extraction task. As a result, the relationships predicted based on a syntactic structure can be unreliable.

Embodiments of the present disclosure provide a relationship extraction network to extract related dependency paths between two given entities. The relationship extraction network generates a path vector representing a path between the entities, and words from the input phrase can be selected as part of the dependency path based on their relationship to the path vector. In some embodiments, the dependency path is generated without the use of a dependency parser. In some examples, the relationship extraction network uses a discriminator network to exclude noisy information. Additionally, embodiments of the present disclosure use a deep learning model to optimize the task of relationship extraction.

By applying the unconventional step of generating a dependency path based on a path vector representing a path between entities, embodiments of the present disclosure can perform accurate relationship extraction for domain specific tasks such as measurement extraction.

Embodiments of the present disclosure may be used in the context of measurement extraction. For example, a relationship extraction network based on the present disclosure may receive an input phrase as natural language text from a document and generate a probability distribution of the relationships between two entities in the document. An example of an application of the inventive concept in the measurement extraction context is provided with reference to FIGS. 1 and 2. Details regarding the architecture of an example relationship extraction network are provided with reference to FIGS. 3 and 4. An example process for relationship extraction are provided with references to FIGS. 5 and 6. A description of an example training process is described with reference to FIGS. 7 and 8.

Measurement Extraction Application

FIG. 1 shows an example of a measurement extraction system according to aspects of the present disclosure. The example shown includes user 100, device 105, cloud 110 relationship extraction apparatus 115, and database 120.

Embodiments of the present disclosure may be used to automatically extract information abut various measurements in a document. In some cases, embodiments of the present disclosure provide a knowledge base. One or more embodiments of the present disclosure provide a model to predict the relation between every combination of two entities a document.

In an example scenario of FIG. 1, an input document relating to user interface design may refer to entities such as canvas size, pixel quantity, height, width, and other measurement-related entities. The relationship extraction apparatus 115 identifies entities in the document and the relationship between the two entities. In the example scenario, the canvas size is determined to be in relation to the height and width entities of the document. While the example set forth in FIG. 1 is related to an image, the present disclosure is not limited thereto and may be used with document management systems, social media, and/or cloud-based document services, and the like.

The user 100 communicates with the relationship extraction apparatus 115 via the device 105 and the cloud 110. For example, the user 100 may provide a document to the relationship extraction apparatus 115. In some examples, the document may be retrieved from a database 120. The device 105 transmits the document to the relationship extraction apparatus 115. The relationship extraction apparatus 115 then extracts entity relationships between words in the text, and the entity relationships are provided back to the user 100 and/or device 105. In some examples, the device 105 communicates with the relationship extraction apparatus 115 via the cloud 110.

According to some embodiments, device 105 provides a document to relationship extraction apparatus 115. The device 105 may include a database with one or more documents to be used by the relationship extraction apparatus 115. In some examples, the device 105 provides a list of entity relationships to the user 100.

The device 105 may be a personal computer, laptop computer, mainframe computer, palmtop computer, personal assistant, mobile device, or any other suitable processing apparatus. The device 105 is an example of, or includes aspects of, the corresponding element described with reference to FIG. 4.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many a user 100 over the Internet. Some large cloud 110 networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

The relationship extraction apparatus 115 recognizes entities in relation to each other and predicts the relationships between the entities. In some cases, the relationship extraction apparatus 115 receives a document as input and provides entity relationships to the user 100. An encoder may be used to provide word representations, where the word representations are based on an object distance and a subject distance. Relationship extraction apparatus 115 is an example of, or includes aspects of, the corresponding element described with reference to FIG. 3.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

One or more embodiments of the present disclosure includes a deep learning model for measurement extraction. The method induces a dependency path between the two entities of interest without relying on external syntactic parsers. A discriminator network is used to exclude noisy information.

Additionally or alternatively, embodiments of the present disclosure identify relationships between multiple entities for a given document (i.e., quantity measured-entity, measured property, qualifier). Quantity is a span that refers to values in a document with a unit. Measured-entity refers to an entity where the value of one of the properties has been measured and provided in the document. Measured-property is a span referring to the measured characteristics of an entity and qualifier refers to a condition in which more information about the quantity, measured-property or measured-entity is provided. The relation between two entities (i.e., whether the selected quantity is provided for the given measured-entity) is predicted for every pair of entities.

Figure 2:
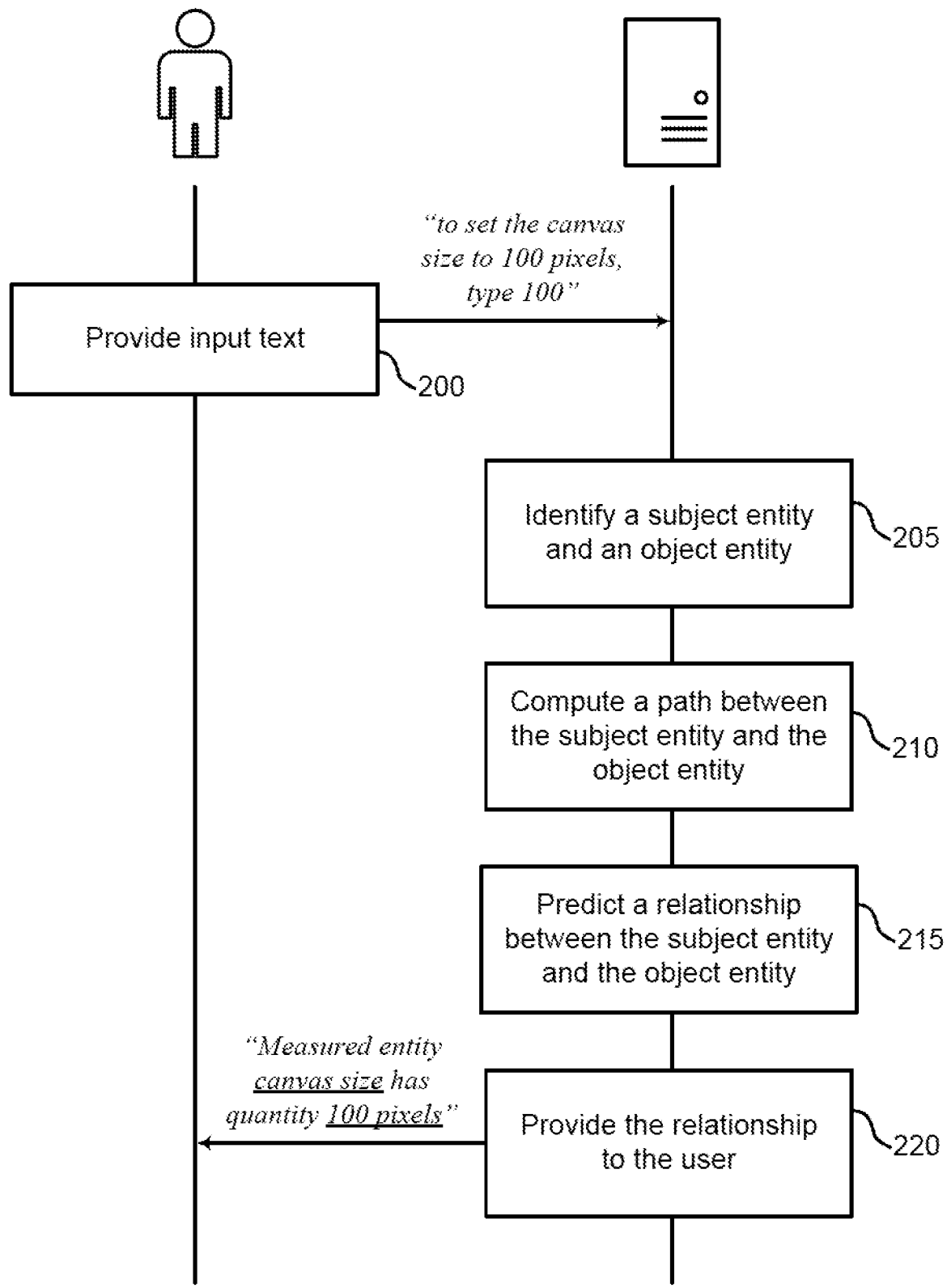
FIG. 2 shows an example of a relationship extraction process according to aspects of the present disclosure.

FIG. 2 shows an example of a measurement extraction process according to aspects of the present disclosure. In some examples, these operations are performed by a system including a processor executing a set of codes to control functional elements of an apparatus, Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In an example scenario, an image editing software may perform simple math in number fields. For example, if a canvas size is to be increased by an additional 100 pixels, '+100' may be input to a width or height field value in a canvas size dialog. The quantities, measured-entities, measured-properties and qualifiers are indicated by start tokens and/or end tokens. Relations include, for example, the canvas size comprises properties width and height. Field values such as pixel quantity, width, and height comprises properties such as pixel quantity change, and a canvas size dialog field qualifies the pixel quantity change.

A syntactic structure (i.e., dependency tree) of an input phrase may be used to infer the relation between two entities of interest. For example, the dependency path may be leveraged between two entities. Use of syntactic: structure: may result in inferior performance since the dependency path does not contain related information or lacks high-quality parser. Dynamically inducing the dependency path using semantics and tailoring a sentence may be used. One or more embodiments of the present disclosure develop a model to extract the most related dependency path between two given entities without relying on a dependency parser.

At operation 200, the system provides input text. In the example in FIG. 1, the database provides the text to set the canvas size to 100 pixels, type 100". In some cases, the input text can be initiated to be drawn from a document stored on a database by a user. The input text can be any document with multiple entities. In some cases, the operations of this step refer to, or may be performed by, a database as described with reference to FIG. 1.

At operation 205, the system identifies a subject entity and an object entity of the input text. A word representation may be generated for each word in an input text. The subject and object entities can be any two entities (i.e., text, measurements, qualifier, etc.). In an example scenario, the subject entity may be a canvas size of a document and the object entity may be a width measurement. In some cases, the operations of this step refer to, or may be performed by, a relationship extraction apparatus as described with reference to FIG. 1.

At operation 210, the system computes a path between the subject entity and the object entity. The system may determine every combination of two entities in a document. The path may be represented as a path vector. The path vector represents a transformation between the subject entity and the object entity based on the word representation. In some cases, the operations of this step refer to, or may be performed by, a relationship extraction apparatus as described with reference to FIG. 1.

At operation 215, the system predicts a relationship between the subject entity and the object entity. A probability distribution may be generated based on the relationships between the subject entity and the object entity based on the path representation. If no relationship is determined, the system will provide a NONE prediction. In some cases, the operations of this step refer to, or may be performed by, a relationship extraction apparatus as described with reference to FIG. 1.

At operation 220, the system provides the relationship to the user. In the example in FIG. 1, the system provides the relationship "Measured entity canvas size has quantity 100 pixels". The relationship may be provided in a separate document or in the same document as the input document. In some cases, the operations of this step refer to, or may be performed by, a relationship extraction apparatus as described with reference to FIG. 1.

Network Architecture

Figure 3:
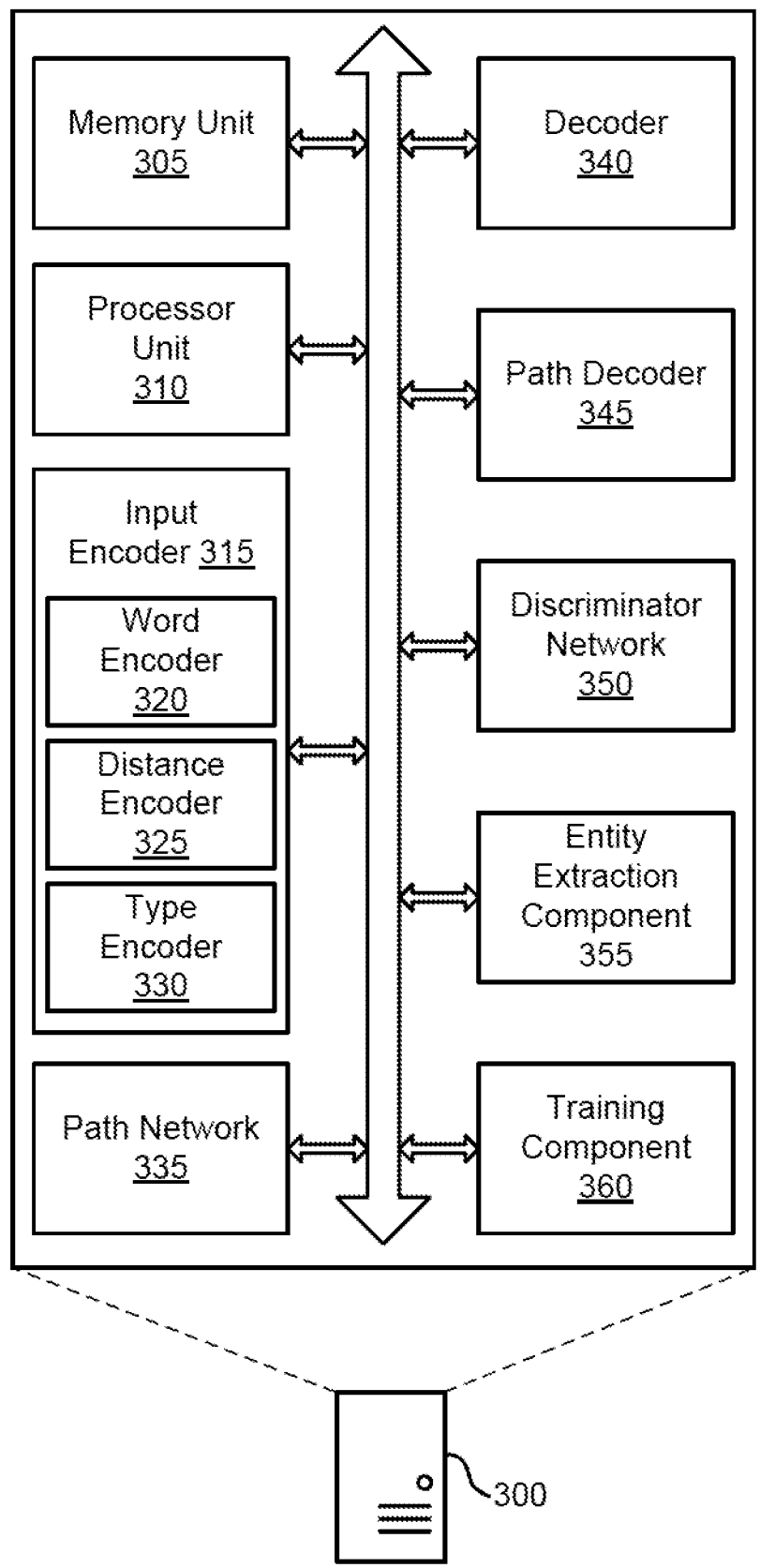
FIG. 3 shows an example of a relationship extraction apparatus according to aspects of the present disclosure.
Figure 4:
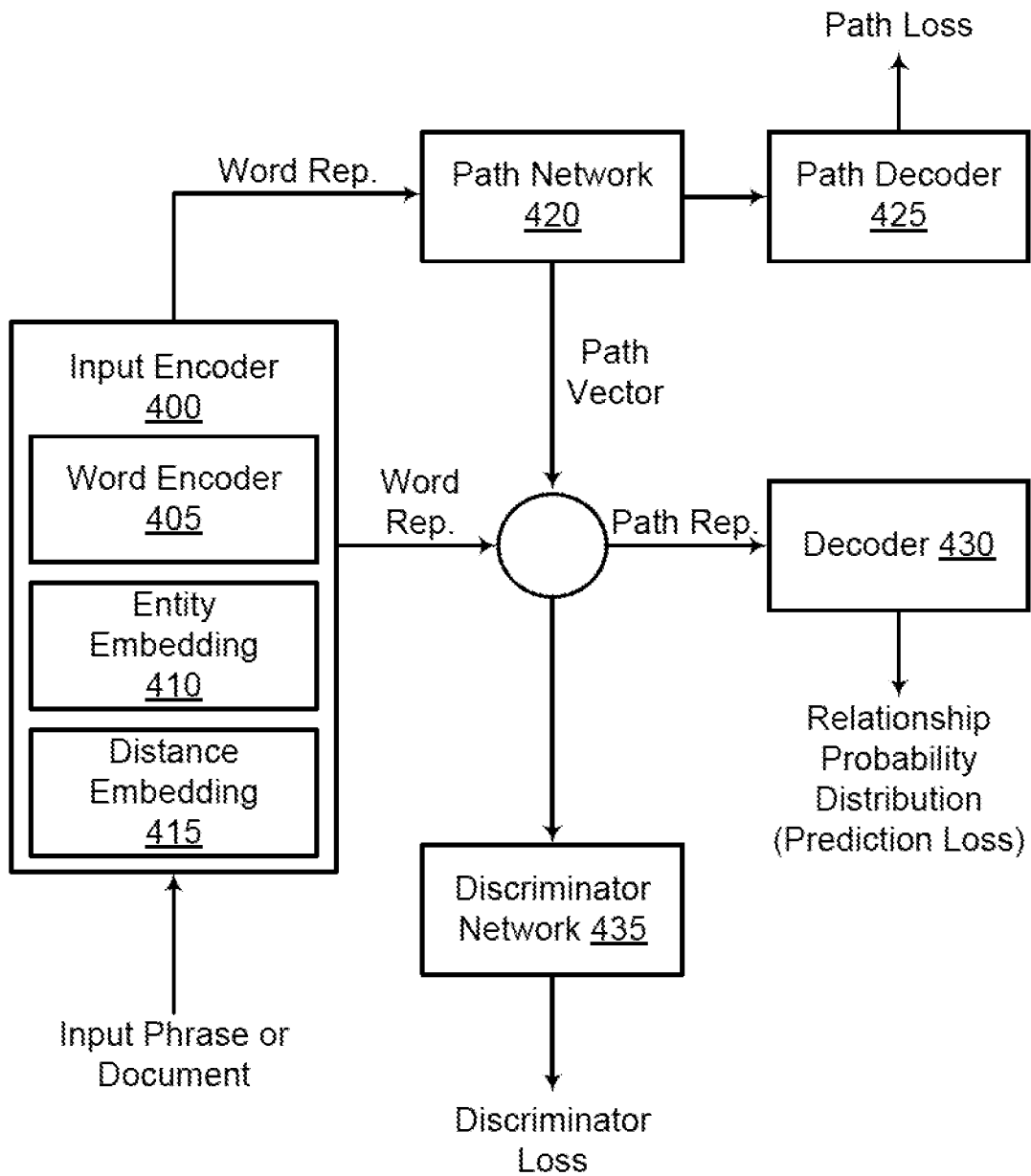
FIG. 4 shows an example of a, relationship extraction network according to aspects of the present disclosure.

In FIGS. 3 and 4, an apparatus, system, and method for relationship extraction are described. One or more embodiments of the apparatus system, and method include an input encoder configured to generate word representations for each word of an input phrase, wherein the input phrase includes a subject entity and an object entity, a path network configured to generate a path vector representing a transformation between the subject entity and the object entity, and a decoder configured to generate a probability distribution over a plurality of candidate relationships between the subject entity and the object entity, wherein the probability distribution is generated based on the path representation for words in a dependency path between the subject entity and the object entity.

In some examples, the input encoder includes a word encoder configured to generate a contextualized embedding for each word in the input phrase, wherein the word representation is based on the contextualized embedding. In some examples, the word encoder comprises a pre-trained transformer network and a bi-directional long short term memory (LSTM), and the path network comprises a feed-forward neural network.

In some examples, the decoder comprises a feed-forward neural network. Some examples of the apparatus, system, and method described above further include a path decoder configured to predict an additional probability distribution based on the path vector.

Some examples of the apparatus, system, and method described above further include a discriminator network configured to discriminate between a combination of the path representation with a positive training sample and a combination of the path representation with a negative training sample, wherein t e path network is trained based on the discrimination.

FIG. 3 shows an example of a relationship extraction apparatus 300 according to aspects of the present disclosure. The example shown includes a relationship extraction apparatus 300 with a memory unit 305, processor unit 310, input encoder 315, path network 335, decoder 340, path decoder 345, discriminator network 350, and entity extraction component 355, and training component 360. In one embodiment, input encoder 315 includes word encoder 320, distance encoder 325, and type encoder 330. Relationship extraction apparatus 300 is an example of, or includes aspects of, the corresponding element described with reference to FIG. 1.

Examples of a memory unit 305 include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operation such as the interaction with peripheral components or devices. In some cases, a memory controller operates memory cells. For example, the memory controller can include a row decoder 340, column decoder 340, or both. In some cases, memory cells within a memory store information in the form of a logical state.

A processor unit 310 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special-purpose components for modem processing, baseband processing, digital signal processing, or transmission processing.

According to some embodiments, input encoder 315 generates a contextualized word embedding for each word in the input phrase, where the word representation is based on the contextualized word embedding. In some examples, input encoder 315 generates an entity type embedding for each word in the input phrase, where the word representation is based on the entity type embedding.

According to some embodiments, input encoder 315 is configured to generate word representations for each word of an input phrase, wherein the input phrase includes a subject entity and an object entity. In some examples, input encoder 315 converts input phrases into high-dimensional word vectors. Input encoder 315 is an example of, or includes aspects of, the corresponding element described with reference to FIG. 4.

In some examples, the input encoder 315 includes a word encoder 320 configured to generate a contextualized word embedding for each word in the input phrase, where the word representation is based on the contextualized embedding. In some examples, the word encoder 320 includes a pre-trained transformer network and a bi-directional LSTM. Word encoder 320 is an example of, or includes aspects of, the corresponding element described with reference to FIG. 4.

An LSTM is a form of recurrent neural network (RNN) that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be Raps of unknown size between related information in the series. LSTMs can help mitigate the vanishing gradient (and exploding gradient) problems when training an RNN.

According to some embodiments, distance encoder 325 computes an object distance and a subject distance for each word in the input phrase, where the word representation is based on the object distance and the subject distance. According to some embodiments, type encoder 330 generates an entity type embedding for each word in the input phrase, where the word representation is based on the entity type embedding.

According to some embodiments, path network 335 generates a path vector representing a transformation between the subject entity and the object entity based on the word representation. In some examples, path network 335 identifies words from the input phrase to include in a dependency path between the subject entity and the object entity based on the path vector and the word representation. In some examples, path network 335 computes a path representation by combining the word representation for the words included in the dependency path. In some examples, path network 335 computes a similarity score for each word in the input phrase based on the path vector. In some examples, path network 335 determines whether the similarity score for each word in the input phrase exceeds a threshold, where the words are included in the dependency path based on the determination.

According to some embodiments, path network 335 is configured to generate a path vector representing a transformation between the subject entity and the object entity. In some examples, the path network 335 includes a feed-forward neural network.

According to some embodiments, path network 335 generates a path vector representing a transformation between the subject entity and the object entity using a path network 335, In some examples, path network 335 generates a path representation based on a dependency path between the subject entity and the object entity, where words in the dependency path are identified based on the path vector. In some examples, the path network 335 is trained based on a multi-task loss function including a set of weighted loss terms. Path network 335 is an example of, or includes aspects of, the corresponding element described with reference to FIG. 4.

According to some embodiments, decoder 340 generates a probability distribution over a set of candidate relationships between the subject entity and the object entity based on the path representation. In some examples, decoder 340 concatenates the path representation with a subject representation of the subject entity and an object representation of the object entity, where the probability representation is generated based on the concatenation. In some examples, decoder 340 predicts a relationship between the subject entity and the object entity based on the probability distribution. In some examples, the set of candidate relationships include measurement relationships between a measured entity, a measured property, a measured quantity, a measured quality, or any combination thereof.

According to some embodiments, decoder 340 is configured to generate a probability distribution over a plurality of candidate relationships between the subject entity and the object entity, wherein the probability distribution is generated based on the path representation for words in a dependency path between the subject entity and the object entity. In some examples, the decoder 340 includes a feed-forward neural network. In some examples, the decoder 340 is trained together with the path network 335. Decoder 340 is an example of, or includes aspects of, the corresponding element described with reference to FIG. 4.

According to some embodiments, during training, path decoder 345 is configured to predict an additional probability distribution based on the path vector and predicts a relationship between the subject entity and the object entity based on the path representation using a decoder 340. In some examples, path decoder 345 generates a probability distribution based on the path vector using a path decoder 345. In some examples, path decoder 345 compares the ground truth relationship with the probability distribution to produce a path loss, where the multi-task loss function includes the path loss. Path decoder 345 is an example of, or includes aspects of, the corresponding element described with reference to FIG. 4.

According to some embodiments, discriminator network 350 is configured to discriminate between a combination of the path representation with a positive training sample and a combination of the path representation with a negative training sample, wherein the path network 335 is trained based on the discrimination.

According to some embodiments, discriminator network 350 combines the path representation with a representation of the training phrase to produce a positive sample. In some examples, discriminator network 350 combines the path representation with an arbitrary phrase to produce a negative sample. In some examples, discriminator network 350 computes a discriminator loss based on the positive sample and the negative sample, where the path the multi-task loss function includes the discriminator loss. Discriminator network 350 is an example of or includes aspects of, the corresponding element described with reference to FIG. 4.

According to some embodiments, entity extraction component 355 may determine the Characteristics of a subject entity or an object entity. In in example scenario, entity extraction component 355 determines the subject entity to be a canvas size of a document and the object entity to be a width measurement. In some cases, the operations of this step refer to, or may be performed by, a relationship extraction apparatus as described with reference to FIG. 1.

According to some embodiments, training component 360 receives a training phrase including a subject entity, an object entity, and a ground truth relationship between the subject entity and the object entity. In some examples, training component 360 compares the ground truth relationship with the predicted relationship to produce a prediction loss. In some examples, training component 360 trains the path network 335 based on the prediction loss.

FIG. 4 shows an example of a relationship extraction diagram according to aspects of the present disclosure. The example shown includes input encoder 400, entity embedding 410, distance embedding 415, path network 420, path decoder 425, decoder 430, and discriminator network 435. According to some embodiments, the entity embedding 415 and distance embedding 420 may be trained based on input terms. Input encoder 400 is an example of or includes aspects of, the corresponding element described with reference to FIG. 3. In one embodiment, input encoder 400 includes word encoder 405, entity embedding 410, and distance embedding 415.

In one example, the input to the model is an input phrase or document D=[$w_1, w_2, \ldots, w_n$] consisting of n words and positions of the two entities of interest, $w_s$ and $w_o$ where s and o are the indices of the first (i.e., subject) and the second (i.e., object) entities, respectively. The input document is annotated with the label 1 from the set L={hasQuantity, hasProperty,qualifies}.

The input encoder 400 converts the input phrase: into high dimensional word vectors. The path network 420 component uses a word vector representations and extracts a dependency path between the two entity mentions in the given document. The discriminator network 435 employs the extracted dependency path as an information bottleneck, which is used to filter out noisy information from the input document. The discriminator loss of the dependency path are used to make the final prediction.

Each word $w_i$ in the input document D is input to the word encoder 405 and is represented using the concatenation of contextual, distance, and entity type embedding components. The input document D, i.e., [CLS]$w_1 \, w_2 \ldots w^n$ [SEP] is fed to a pre-trained transformer (i.e., $\text{BERT}_{base}$) and hidden states of the last layer of the BERT model, i.e., E=[$e^1, e_2, \ldots, e_n$], are taken as the contextualized word embedding of the input document. The average of the word-piece embeddings obtained from the BERT model is used for words that have multiple word-pieces.

The distance embedding 415 of each word $w_i$ to the subject $w_s$ and the object $w_o$ is computed, i.e., $d_s^i=\|i-s\|$ and $d_o^i=\|i-o\|$, respectively. The embedded distances are represented using high dimensional vectors $e_i^s$ and $e_j^o$ obtained from randomly initialized embedding tables. The embedding tables are updated during training. The type of the entity embeddings 415 are represented using high dimensional vectors obtained from randomly initialized embedding tables. The embedding tables are fine-tuned during training.

The concatenation of embedding vectors, i.e., X=[$x_1, x_2, \ldots, x_n$], are used to represent the words of the input document. The vectors X are input to a sequence processing model (e.g., bi-directional long short-term memory, BiLSTM network) and the hidden states of the BiLSTM neurons are used i.e., H=[$h_1, h_2, \ldots, h_n$], as the final vector representations of the input document D. The vectors H are used by the subsequent components. This is done to tailor the contextualization of the word embeddings to the task since the parameters of the pre-trained $\text{BERT}_{base}$ are fixed during training. Word encoder 405 is an example of, or includes aspects of, the corresponding element described with reference to FIG. 3.

The dependency path between the subject and object entities is found by employing a translation-based perspective. Given the vector representations of the subject entity, i.e., $h_s$, and the object entity, i.e., $h_o$, the dependency path is represented using the path vector P such that, the subject representation $h_s$ is transferred (i.e., translated) to the object representation $h_o$, under the operation $\Phi$. The path vector P is defined by exploiting the inverse operation $\Phi^{-1}$, i.e., P=$\Phi^{-1}(h_s,h_o)$ using the definition $h_o=\Phi(h_s,P)$. The path vector P is compared with the representations of other words of the document D to assess the likelihood to be included in the dependency path.

The similarity between the vectors $h_i$ and P may be used to estimate the probability of the word i in the dependency path. However, the likelihood of the word $w_i$ is computed regardless of the other words $w_j$ where $j \not\in \{i, s, o\}$. Therefore, the likelihood of the word $w_i$ is computed based on the interaction between the representation of the word $w_i$, i.e., $h_i$, the representations of the other words, i.e., $h_j$ for $j \not\in \{i, s, o\}$, and the path vector P. A vector representation for the words $w_j$ is computed by applying a down-sampling strategy (e.g., MAX_POOL operation) on the words $w_j$ for $j \not\in \{i, s, o\}$: $\overline{h}_{-i}$=MAX_POOL($h_1,h_2, \ldots, h_j$). The function $\Phi^{-1}$ on the vectors P and $\overline{h}_{-i}$: $\hat{h}_i=\Phi^{-1}(\overline{h}_{-i},P)$. The vector $\hat{h}_i$ represents the path for transferring (i.e., translating) the vector $\overline{h}_{-i}$ to P.

The similarity between $\hat{h}_i$ and $h_i$ may reveal the importance of the word $w_i$ to convert the representation of the context $w_j$ for $j \not\in \{i, s, o\}$ to the representation of the path vector P. Therefore, the similarity, i.e., $Sim_i=\|\hat{h}_i, h_i\|$, is used as the score of the word $w_i$ to be included in the dependency path. The words with scores above a pre-defined threshold are used as the inferred dependency path.

A feed-forward neural network is an artificial neural network (ANN) Where the connections between nodes do not form a cycle. Information moves in one direction from input nodes, to hidden nodes, then to output nodes.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A feed-forward neural network is used to learn the function $\Phi^{-1}$. The concatenation of the vectors $h_s$ and $h_o$ are fed into a 2-layer feed-forward neural network with $|P|$ neurons at the final layer: $P=FF([h_s:h_o])$, where [:] represents concatenation and FF represents the feed-forward neural network. The vector P is used to predict the probability distribution $P\Phi(\cdot|D, t, \alpha)$ using another feed-forward network $FF_2$ whose final layer dimension equals the number of labels, i.e., $|L|$ to train the FF network for the RE task. The negative log-likelihood is used to train the FF and $FF_2$ networks: $\mathcal{L}_\Phi=-\log(P_\Phi(l|D, t, \alpha))$ where l is the gold label.

The max-pooled representation of the words is taken in the path: $h_p=MAX\_POOL(h_1, h_2, \ldots, h_p)$ where p is the number of words in the induced dependency path to represent the induced path. The path representation $h_p$ is used by the decoder 430 and the discriminator network 435. Path network 420 is an example of, or includes aspects of, the corresponding element described with reference to FIG. 3.

Path decoder 425 is an example of, or includes aspects of, the corresponding element described with reference to FIG. 3.

In the decoder 430, a prediction loss on the relation between a given subject and object entities is determined by using word representations of the words in the dependency path (i.e., $h_p$), the subject entity (i.e., $h_s$), and the object entity (i.e., $h_o$) to construct the final vector $V=[h_p:h_s:h_o]$ where [:] represent concatenation. The vector V is consumed by a feed-forward neural network to predict the distribution $P(\cdot|D,t,\alpha)$. The loss function to train the main RE task is defined as $\mathcal{L}_{pred}=-\log(P(l|D,t,\alpha))$ where l is the gold label. The overall loss function to train the entire model is: $\mathcal{L}=\mathcal{L}_{pred}+\alpha\mathcal{L}_\Phi+\beta\mathcal{L}_{disc}$ where $\alpha$ and $\beta$ are the trade-off parameters. Decoder 430 is an example of, or includes aspects of, the corresponding element described with reference to FIG. 3.

The induced dependency path contains information for the RE task with noisy information due to the contextualization in the input encoder. One or more embodiments of the present disclosure use the induced path as an information bottleneck (IB) to overcome the noisy information. The IB reduces mutual information between the input and bottleneck to increase mutual information between the bottleneck and the output. The bottleneck (i.e., the dependency path representation $h_p$) is used by the decoder 430, and the increase of mutual information with the output s enforced by reducing the training loss (e.g., negative log-likelihood).

The mutual information between the input and the bottleneck is decreased by using a contrastive learning paradigm to estimate the mutual information between two high-dimensional vectors using the classification loss of a binary-discriminator. The path representation $h_p$ is concatenated with the max-pooled representation of the input document D, i.e., $h_d=MAX\_POOL(h_1,h_2, \ldots, h_n)$, and the concatenation, i.e., serves as the positive sample for contrastive learning. The negative samples are constructed by taking the max-pooled representation of a randomly chosen document D' from the same mini-batch, i.e., $h_{d'}=MAX\_POOL(h_1', h_2', \ldots, h_m')$ where $h_i'$ the representation of the i-th word in the document D' and m is the total number of words in D'.

The concatenation of $h_p$ and $h_{d'}$ is employed as the negative sample: $h_{neg}=[h_p: h_{d'}]$. A feed-forward discriminator is employed and trained to distinguish the positive samples from negative ones, i.e., $\mathcal{L}_{disc}=\log(1+e^{(1-D_{pos})})+\log(1+e^{D(h_{neg})})$. The discriminator loss $\mathcal{L}_{disc}$ is added to the final loss function and decreased, which results in decrease of the estimated mutual information between the input and the bottleneck (i.e., the path representation $h_p$). Discriminator network 435 is an example of, or includes aspects of, the corresponding element described with reference to FIG. 3.

Relationship Extraction

Figure 5:
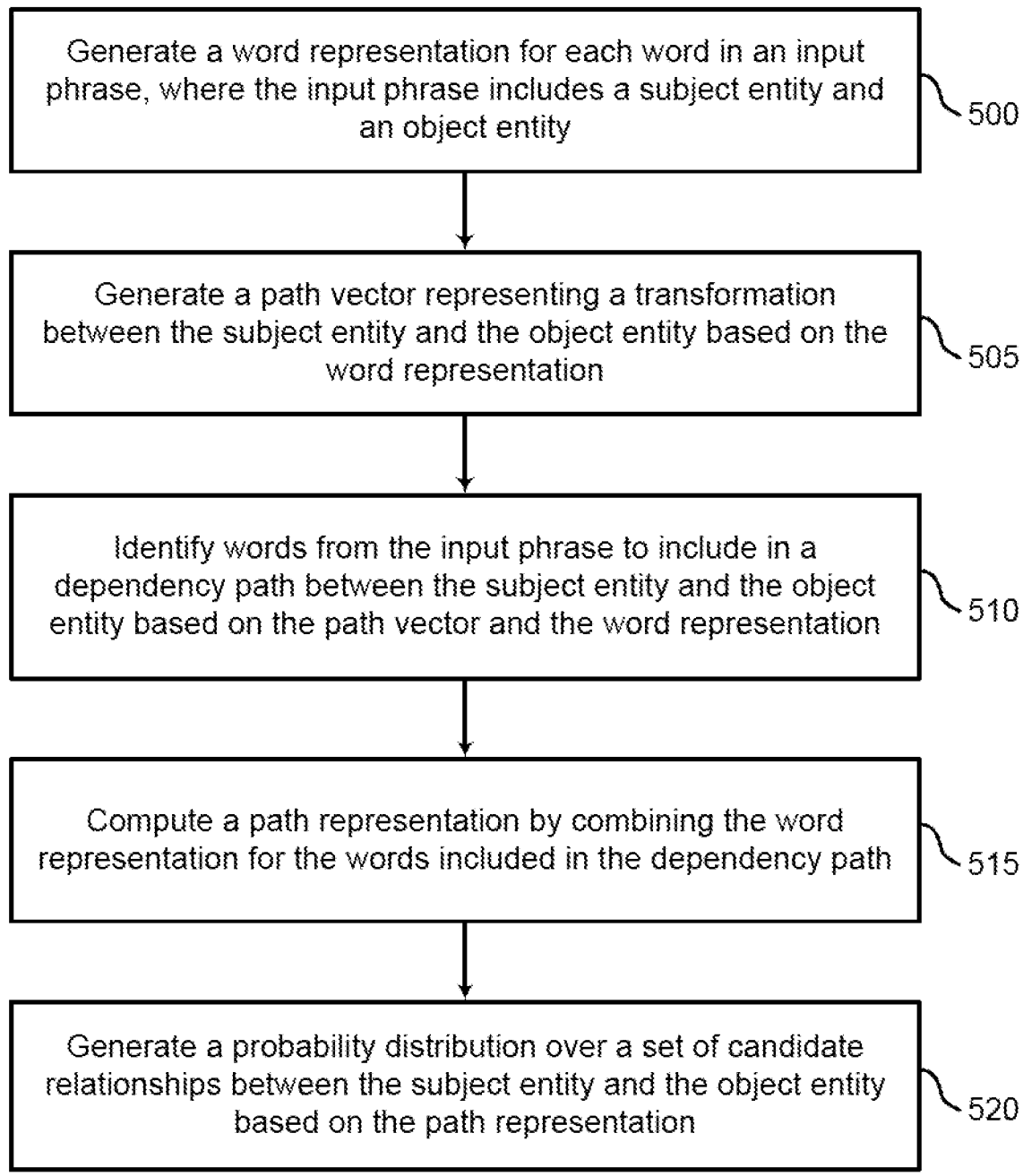
FIG. 5 shows an example of a process for relationship extraction according to aspects of the present disclosure.
Figure 6:
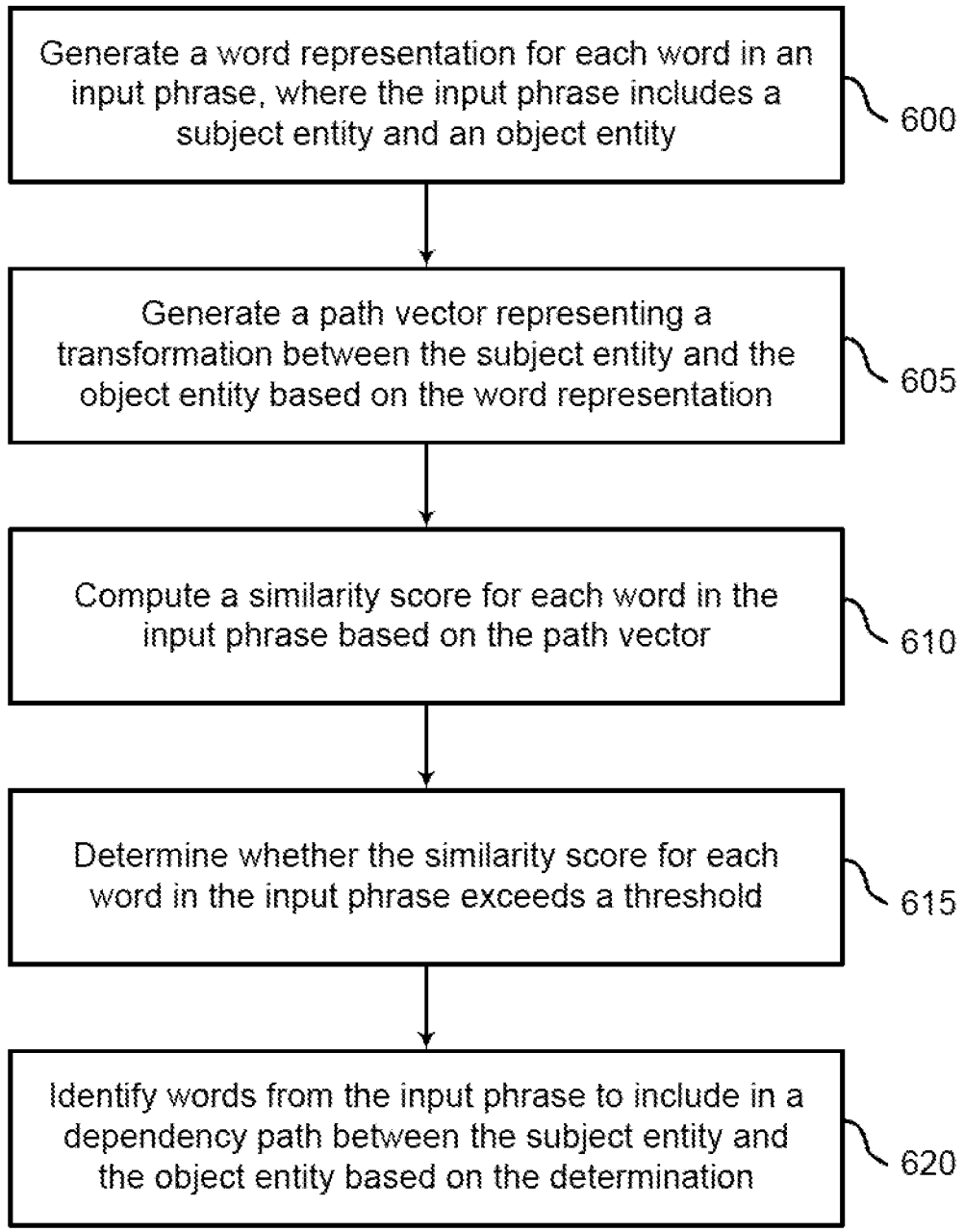
FIG. 6 shows an example of a process for generating a dependency path according to aspects of the present disclosure.

In FIGS. 5 and 6, a method, apparatus, non-transitory computer-readable medium, and system for relationship extraction are described. One or more embodiments of the method, apparatus, non-transitory computer-readable medium, and system include generating a word representation for each word in an input phrase, wherein the input phrase includes a subject entity and an object entity, generating a path vector representing a transformation between the subject entity and the object entity based on the word representation, identifying words from the input phrase to include in a dependency path between the subject entity and the object entity based on the path vector and the word representation, computing a path representation by combining the word representation for the words included in the dependency path, and generating a probability distribution over a plurality of candidate relationships between the subject entity and the object entity based on the path representation.

Some examples of the method, apparatus, non-transitory computer-readable medium and system described above further include generating a contextualized word embedding for each word in the input phrase, wherein the word representation is based on the contextualized word embedding. Some examples of the method, apparatus, non-transitory computer-readable medium, and system described above further include computing an object distance and a subject distance for each word in the input phrase, wherein the word representation is based on the object distance and the subject distance. Some examples of the method, apparatus, non-transitory computer-readable medium, and system described above further include generating an entity type embedding for each word in the input phrase, wherein the word representation is based on the entity type embedding.

Some examples of the method, apparatus, non-transitory computer-readable medium, and system described above further include computing a similarity score for each word in the input phrase based on the path vector. Some examples further include determining whether the similarity score for each word in the input phrase exceeds a threshold, wherein the words are included in the dependency path based on the determination. Some examples of the method, apparatus, non-transitory computer-readable medium, and system described above further include concatenating the path representation with a subject representation of the subject entity and an object representation of the object entity, wherein the probability representation is generated based on the concatenation.

Some examples of the method, apparatus, non-transitory computer-readable medium, and system described above thither include predicting a relationship between the subject entity and the object entity based on the probability distribution. In some examples, the plurality of candidate relationships include measurement relationships between a measured entity, a measured property, a measured quantity, a measured quality, or any combination thereof.

FIG. 5 shows an example of a process for relationship extraction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system generates a word representation for each word in an input phrase, where the input phrase includes a subject entity and an object entity. The input phrase is converted to a high-dimensional word vector. In some cases, the operations of this step refer to, or may be perfumed by, an input encoder as described with reference to FIGS. 3 and 4.

At operation 505, the system generates a path vector representing a transformation between the subject entity and the object entity based on the word representation. The path vector relates to the relationship between the subject and object entities. The words in a dependency path are identified based on the path vector, and the a path representation is based on a dependency path between the subject entity and the object entity. In some cases, the operations of this step refer to, or may be performed by, a path network as described with reference to FIGS. 3 and 4.

At operation 510, the system identifies words from the input phrase to include in a dependency path between the subject entity and the object entity based on the path vector and the word representation. The words can be any spoken natural language. The dependency path includes relation information related to the subject and object entities. In some cases, the operations of this step refer to, or may be performed by, a path network as described with reference to FIGS. 3 and 4.

At operation 515, the system computes a path representation by combining the word representation for the words included in the dependency path. The path representation is compared to the representations of the other words of the document to assess a likelihood to be included in the dependency path. In some cases, the operations of this step refer to, or may be performed by, a path network as described with reference to FIGS. 3 and 4.

At operation 520, the system generates a probability distribution over a set of candidate relationships between the subject entity and the object entity based on the path representation. The probability distribution is determined using the dependency path. In some cases, the operations of this step refer to, or may be performed by, a decoder as described with reference to FIGS. 3 and 4.

FIG. 6 shows an example of a process for generating a dependency path according to aspects of the present disclosure. In some examples, these operations are performed by a system including a processor executing a set of codes to control thnctional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system generates a word representation for each word in an input phrase, where the input phrase includes a subject entity and an object entity. The input phrase is converted to a high-dimensional word vector. In some cases, the operations of this step refer to, or may be performed by, an input encoder as described with reference to FIGS. 3 and 4.

At operation 605, the system generates a path vector representing a transformation between the subject entity and the object entity based on the word representation. The path vector relates to the relationship between the subject and object entities. The words in a dependency path are identified based on the path vector, and the a path representation is based on a dependency path between the subject entity and the object entity. In some cases, the operations of this step refer to, or may be performed by, a path network as described with reference to FIGS. 3 and 4.

At operation 610, the system computes a similarity score for each word in the input phrase based on the path vector. The similarity score is value assigned to words that provides information about how similar each word is to the other. In some cases, the Operations of this step refer to, or may be performed by, a path network as described with reference to FIGS. 3 and 4.

At operation 615, the system determines whether the similarity score for each word in the input phrase exceeds a threshold, where the words are included in the dependency path based on the determination. The words with similarity scores above the threshold are used for the dependency path determination. In some cases, the operations of this step refer to, or may be performed by, a path network as described with reference to FIGS. 3 and 4.

At operation 620, the system identifies words from the input phrase to include in a dependency path between the subject entity and the object entity based on the determination. The words can be any spoken natural language. The dependency path includes relation information related to the subject and object entities. In some cases, the operations of this step refer to, or may be performed by, a path network as described with reference to FIGS. 3 and 4.

Training

Figure 7:
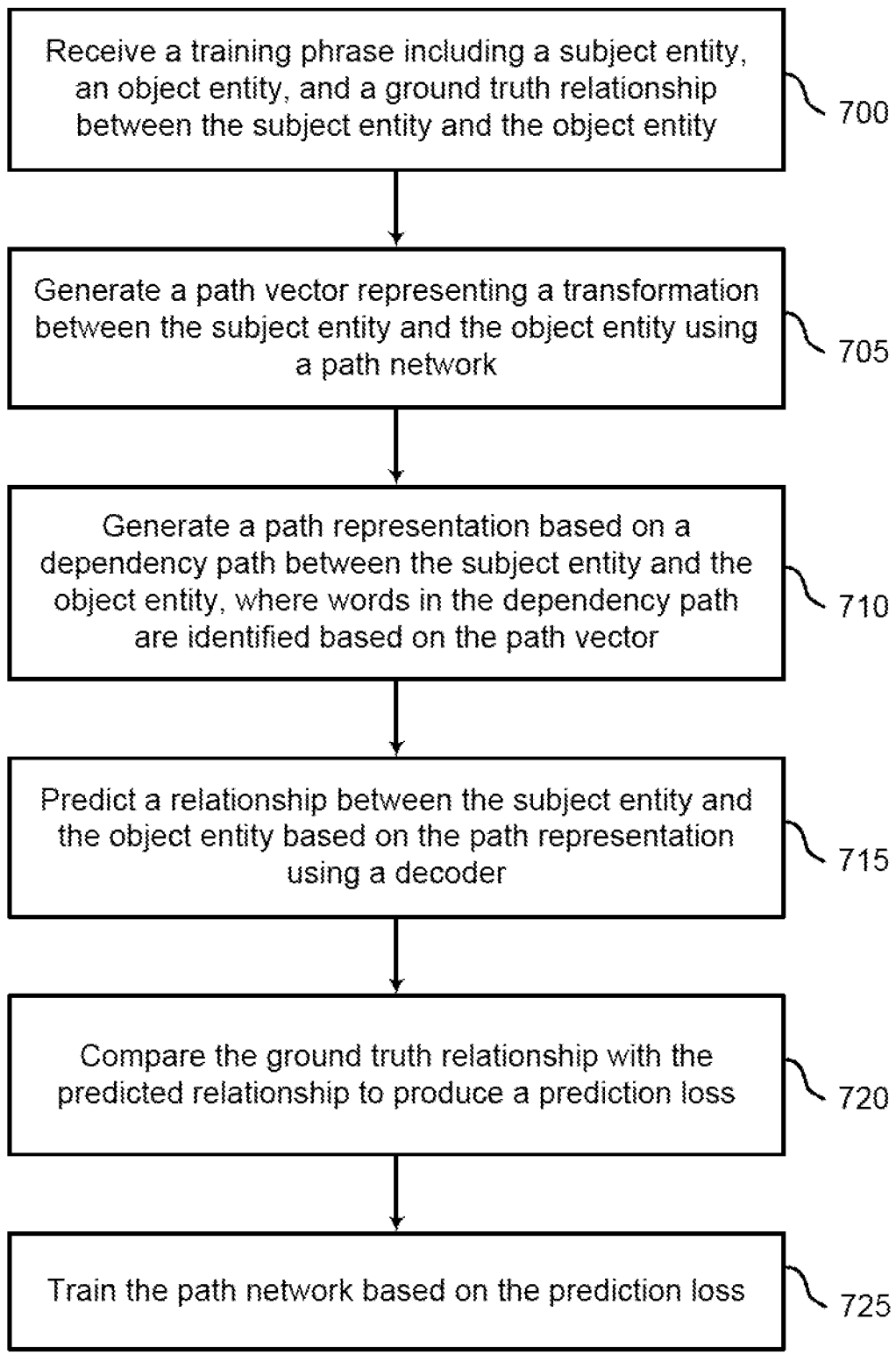
FIG. 7 shows an example of a process for training a neural network according to aspects of the present disclosure.
Figure 8:
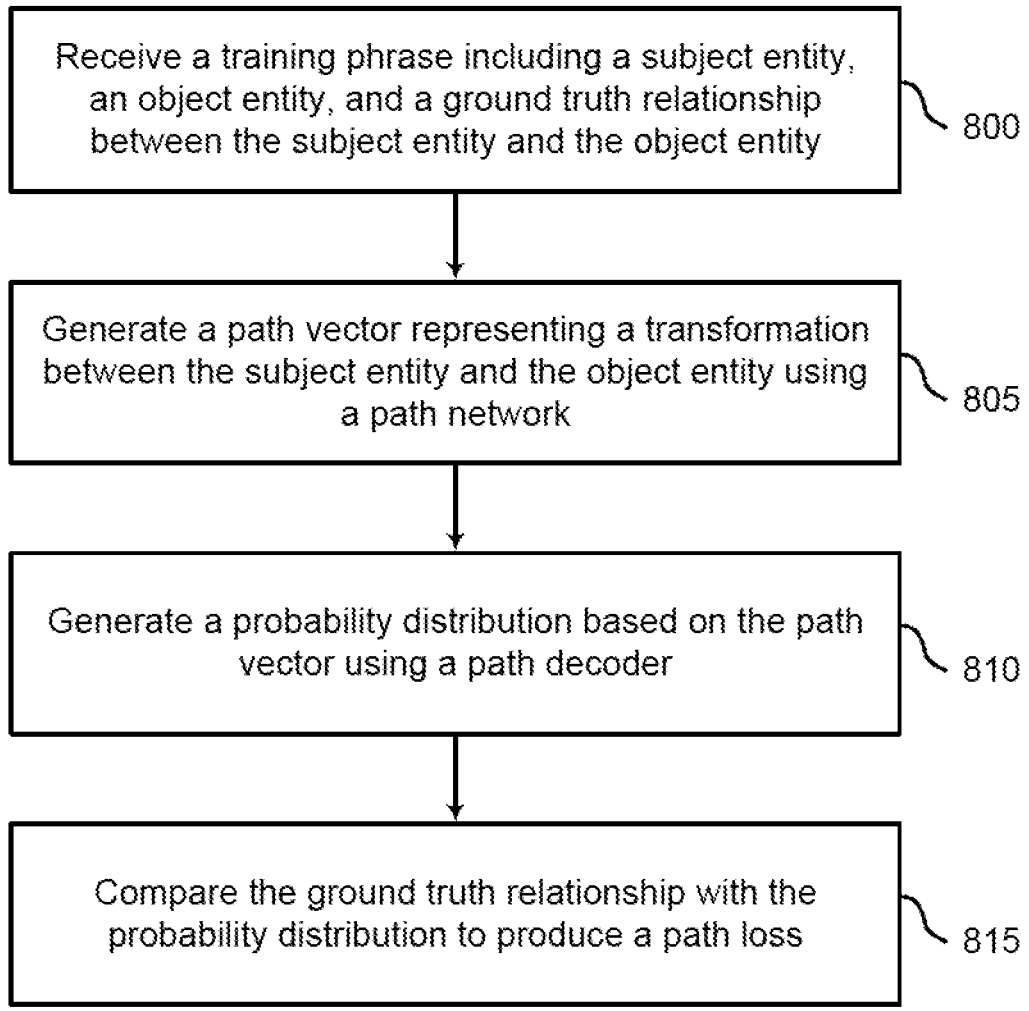
FIG. 8 shows an example of a process for computing a path loss according to aspects of the present disclosure.
Figure 9:
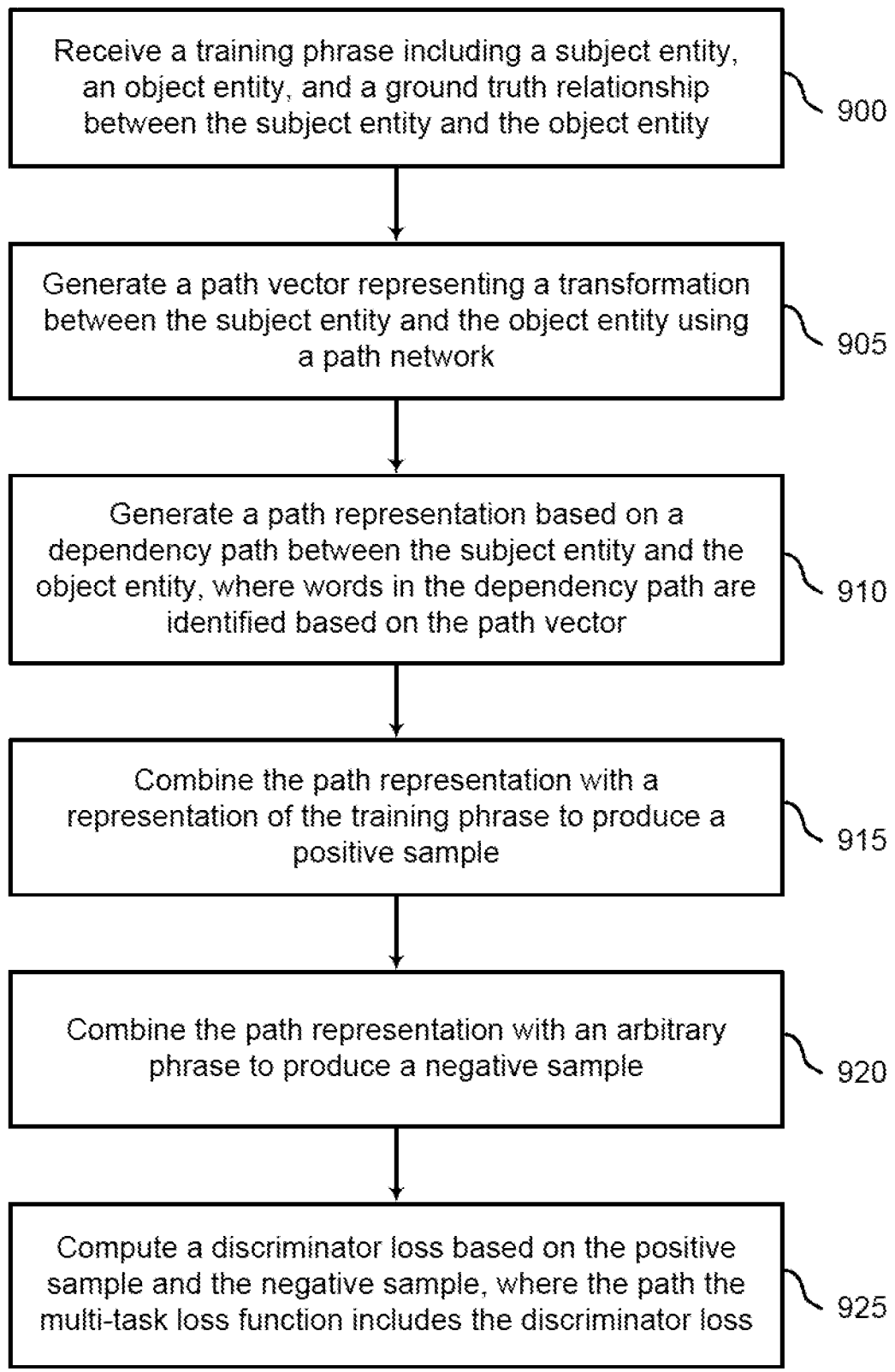
FIG. 9 shows an example of a process for generating a discriminator loss according to aspects of the present disclosure.

In FIGS. 7-9, examples of a method, apparatus, non-transitory computer-readable medium, and system for training a neural network for relationship extraction are described. One or more embodiments of the method, apparatus, non-transitory computer-readable medium, and system include receiving a training phrase including a subject entity, an object entity, and a ground truth relationship between the subject entity and the object entity, generating a path vector representing a transformation between the subject entity and the object entity using a path network, generating a path representation based on a dependency path between the subject entity and the object entity, wherein words in the dependency path are identified based on the path vector, predicting a relationship between the subject entity and the object entity based on the path representation using a decoder, comparing the ground truth relationship with the predicted relationship to produce a prediction loss, and training the path network based on the prediction loss.

In some examples, the decoder is trained together with the path network, and the path network is trained based on a multi-task loss function including a plurality of weighted loss terms. Some examples of the method, apparatus, non-transitory computer-readable medium, and system described above further include generating a probability distribution based on the path vector using a path decoder. Some examples further include comparing the ground truth relationship with the probability distribution to produce a path loss, wherein the multi-task loss function includes the path loss.

Some examples of the method, apparatus, non-transitory computer-readable medium, and system described above further include combining the path representation with a representation of the training phrase to produce a positive sample. Some examples further include combining the path representation with an arbitrary phrase to produce a negative sample. Some examples further include computing a discriminator loss based on the positive sample and the negative sample, wherein the path the multi-task loss function includes the discriminator loss.

FIG. 7 shows an example of a process for training a, neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed m conjunction with other operations.

At operation 700, the system receives a training phrase including a subject entity, an object entity, and a ground truth relationship between the subject entity and the object entity. The training phrase may be any natural language text or speech phrase. In an example scenario, in the sentence "Barack Obama was born in Honolulu, Hawaii", the subject entity "Barack Obama" has the relationship bornInCity with the object entity "Honolulu, Hawaii". In some cases, the operations of this step refer to, or may be performed by, a training component as described with reference to FIG. 3.

At operation 705, the system generates a path vector representing a transformation between the subject entity and the object entity using a path network. The words in a dependency path are identified based on the path vector, and the path representation is based on a dependency path between the subject entity and the object entity. The probability distribution is based on the information of path vector. In some cases, the operations of this step refer to, or may be performed by, a path network as described with reference to FIGS. 3 and 4.

At operation 710, the system generates a path representation based on a dependency path between the subject entity and the object entity, where words in the dependency path are identified based on the path vector. A positive sample may be determined by combining the path representation with a representation of the training phrase. In some cases, the operations of this step refer to, or may be performed by, a path network as described with reference to FIGS. 3 and 4.

At operation 715, the system predicts a relationship between the subject entity and the object entity based on the path representation using a decoder. The prediction is based on the dependency path, the subject entity, and the object entity. A feed-forward neural network is used to determine the prediction. In some cases, the operations of this step refer to, or may be performed by, a path decoder as described with reference to FIGS. 3 and 4.

At operation 720, the system compares the ground truth relationship with the predicted relationship to produce a prediction loss. The prediction loss is used to determine an overall loss value of the relationship extraction network. In some cases, the operations of this step refer to, or may be performed by, a training component as described with reference to FIG. 3.

At operation 725, the system trains the path network based on the prediction loss. During training, the entity embedding and distance embedding are updated. In some cases, the operations of this step refer to, or may be performed by, a training component as described with reference to FIG. 3.

FIG. 8 shows an example of a process for computing a path loss according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 800, the system receives a training phrase including a subject entity, an object entity, and a ground truth relationship between the subject entity and the object entity. The training phrase may be any natural language text or speech phrase. In an example scenario, in the sentence "Barack Obama was born in Honolulu, Hawaii", the subject entity "Barack Obama" has the relationship bornInCity with the object entity "Honolulu, Hawaii". In some cases, the operations of this step refer to, or may be performed by, a training component as described with reference to FIG. 3.

At operation 805, the system generates a path vector representing a transformation between the subject entity and the object entity using a path network. The path vector relates to the relationship between the subject and object entities. The words in a dependency path are identified based on the path vector, and the path representation is based on a dependency path between the subject entity and the object entity. In some cases, the operations of this step refer to, or may be performed by, a path network as described with reference to FIGS. 3 and 4.

At operation 810, the system generates a probability distribution based on the path vector using a path decoder. In some cases, the operations of this step refer to, or may be performed by, a path decoder as described with reference to FIGS. 3 and 4.

At operation 815, the system compares the ground truth relationship with the probability distribution to produce a path loss. In some cases, the operations of this step refer to, or may be performed by, a path decoder as described with reference to FIGS. 3 and 4.

FIG. 9 shows an example of a process for generating a discriminator loss according to aspects of the present disclosure. In seine examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system receives a training phrase including a subject entity, an object entity, and a ground truth relationship between the subject entity and the object entity. The training phrase may be any natural language text or speech phrase. In an example scenario, in the sentence "Barack Obama was born in Honolulu, Hawaii", the subject entity "Barack Obama" has the relationship borninCity with the object entity "Honolulu, Hawaii". In some cases, the operations of this step refer to, or may be performed by, a training component as described with reference to FIG. 3.

At operation 905, the system generates a path vector representing a transformation between the subject entity and the object entity using a path network. The path vector relates to the relationship between the subject and object entities. The words in a dependency path are identified based on the path vector, and the path representation is based on a dependency path between the subject entity and the object entity. In some cases, the operations of this step refer to, or may be performed by, a path network as described with reference to FIGS. 3 and 4.

At operation 910, the system generates a path representation based on a dependency path between the subject entity and the object entity, where words in the dependency path are identified based on the path vector. A positive sample may be determined by combining the path representation with a representation of the training phrase. In some cases, the operations of this step refer to, or may be performed by, a path network as described with reference to FIGS. 3 and 4.

At operation 915, the system combines the path representation with a representation of the training phrase to produce a positive sample. The path representation is concatenated with a max-pooled representation of the input phrase. The concatenation is the positive sample. In some cases, the operations of this step refer to, or may be performed by, a discriminator network as described with reference to FIGS. 3 and 4.

At operation 920, the system combines the path representation with an arbitrary phrase to produce a negative sample. In some cases, the operations of this step refer to, or may be performed by, a discriminator network as described with reference to FIGS. 3 and 4.

At operation 925, the system computes a discriminator loss based on the positive sample and the negative sample, where the path the multi-task loss function includes the discriminator loss. In some cases, the operations of this step refer to, or may be performed by, a discriminator network as described with reference to FIGS. 3 and 4.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor a digital signal processor (DSP), an application specific integrated circuit 10, a held programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
generating a word representation for each word in an input phrase, wherein the input phrase includes a subject entity, an object entity, a candidate word, and one or more additional words;
generating a path vector representing a transformation between the subject entity and the object entity using a path network, wherein the path vector is generated based on the word representation for the subject entity and the object entity, respectively;
computing an exclusion vector corresponding to the candidate word, wherein the exclusion vector is based on the one or more additional words from the input phrase excluding the candidate word, the subject entity, and the object entity;
computing a transfer vector corresponding to the candidate word based on the path vector and the exclusion vector;
including the candidate word in a dependency path between the subject entity and the object entity based on a similarity between the transfer vector and the word representation for the candidate word;
computing a path representation based on the dependency path; and
identifying a relationship between the subject entity and the object entity based on the path representation.

2. The method of claim 1, further comprising:
generating a contextualized word embedding for the each word in the input phrase, wherein the word representation is based on the contextualized word embedding.

3. The method of claim 1, further comprising:
computing an object distance and a subject distance for the each word in the input phrase, wherein the word representation is based on the object distance and the subject distance.

4. The method of claim 1, further comprising:
generating an entity type embedding for the each word in the input phrase, wherein the word representation is based on the entity type embedding.

5. The method of claim 1, further comprising:
computing a similarity score for the each word in the input phrase based on the path vector; and
determining whether the similarity score for the each word in the input phrase exceeds a threshold, wherein the candidate word is included in the dependency path based on the determination.

6. The method of claim 1, further comprising:
concatenating the path representation with a subject representation of the subject entity and an object representation of the object entity, wherein a probability distribution is generated based on the concatenation.

7. The method of claim 1, further comprising:
predicting the relationship between the subject entity and the object entity based on a probability distribution.

8. The method of claim 1, further comprising:
generating a plurality of candidate relationships including measurement relationships between a measured entity, a measured property, a measured quantity, a measured quality, or any combination thereof.

9. An apparatus comprising:
an input encoder configured to generate a word representation for each word of an input phrase, wherein the input phrase includes a subject entity, an object entity, a candidate word, and one or more additional words;
a path network configured to
generate a path vector representing a transformation between the subject entity and the object entity based on the word representation for the subject entity and the object entity, respectively,
compute an exclusion vector corresponding to the candidate word, wherein the exclusion vector is based the on one or more additional words from the input phrase excluding the candidate word, the subject entity, and the object entity,
compute a transfer vector corresponding to the candidate word based on the path vector and the exclusion vector,
including the candidate word in a dependency path between the subject entity and the object entity based on a similarity between the transfer vector and the word representation for the candidate word, and
compute a path representation based on the dependency path; and
a decoder configured to identify a relationship between the subject entity and the object entity.

10. The apparatus of claim 9, wherein:
the input encoder includes a word encoder configured to generate a contextualized embedding for the each word in the input phrase, wherein the word representation is based on the contextualized embedding.

11. The apparatus of claim 10, further comprising:
the word encoder comprises a pre-trained transformer network and a bi-directional LSTM.

12. The apparatus of claim 9, wherein:
the path network comprises a feed forward neural network.

13. The apparatus of claim 9, wherein:
the decoder comprises a feed forward neural network.

14. The apparatus of claim 9, further comprising:
a path decoder configured to predict an additional probability distribution based on the path vector.

15. The apparatus of claim 9, further comprising:
a discriminator network configured to discriminate between a combination of the path representation with a positive training sample and a combination of the path representation with a negative training sample, wherein the path network is trained based on the discrimination.

16. A method of training a neural network, the method comprising:
receiving a training phrase including a subject entity, an object entity, a candidate word, one or more additional words, and a ground truth relationship between the subject entity and the object entity;
generating a path vector representing a transformation between the subject entity and the object entity using a path network, wherein the path vector is generated based on a word representation for the subject entity and the object entity, respectively;
computing an exclusion vector corresponding to the candidate word, wherein the exclusion vector is based on the one or more additional words from the training phrase excluding the candidate word, the subject entity, and the object entity;
computing a transfer vector corresponding to the candidate word based on the path vector and the exclusion vector;
including the candidate word in a dependency path between the subject entity and the object entity based on a similarity between the transfer vector and the word representation for the candidate word;

generating a path representation based on the dependency path;
predicting a relationship between the subject entity and the object entity based on the path representation using a decoder;
comparing the ground truth relationship with the predicted relationship to produce a prediction loss; and
training the path network based on the prediction loss.

17. The method of claim 16, wherein:
the decoder is trained together with the path network.

18. The method of claim 16, wherein:
the path network is trained based on a multi-task loss function including a plurality of weighted loss terms.

19. The method of claim 18, further comprising:
generating a probability distribution based on the path vector using a path decoder; and
comparing the ground truth relationship with the probability distribution to produce a path loss, wherein the multi-task loss function includes the path loss.

20. The method of claim 19, further comprising:
combining the path representation with a representation of the training phrase to produce a positive sample;
combining the path representation with an arbitrary phrase to produce a negative sample; and
computing a discriminator loss based on the positive sample and the negative sample, wherein the path loss of the multi-task loss function includes the discriminator loss.

* * * * *